(12) United States Patent
Kyriazis et al.

(10) Patent No.: US 8,656,060 B2
(45) Date of Patent: Feb. 18, 2014

(54) METHOD AND APPARATUS FOR MANAGING RESOURCES FOR DISPLAYS

(75) Inventors: George Kyriazis, San Jose, CA (US);
Maciej Macicsowicz, Gilroy, CA (US);
David A. Curran, Newark, CA (US);
Ian C. Hendry, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1021 days.

(21) Appl. No.: 12/717,731

(22) Filed: Mar. 4, 2010

(65) Prior Publication Data

US 2011/0216245 A1 Sep. 8, 2011

(51) Int. Cl.
*G06F 3/00* (2006.01)
*G08B 23/00* (2006.01)

(52) U.S. Cl.
USPC .............................................. 710/8; 348/723

(58) Field of Classification Search
None
See application file for complete search history.

(56) References Cited

U.S. PATENT DOCUMENTS

2005/0096134 A1* 5/2005 Lippincott ...................... 463/40
2010/0238089 A1* 9/2010 Massand .......................... 345/1.1

* cited by examiner

*Primary Examiner* — Hyun Nam
(74) *Attorney, Agent, or Firm* — Fletcher Yoder PC

(57) ABSTRACT

The disclosed embodiments provide a system for managing multiple sink devices in a computer system. During operation, the system performs a discovery operation to identify one or more sink devices which are coupled to the computer system, wherein the discovery operation determines an interconnection topology between the computer system and the one or more sink devices, and wherein multiple sink devices can be coupled to the computer system through the same connector. Next, the system associates the one or more sink devices with one or more frame buffers which are used to assemble content streams for the one or more sink devices. Finally, the system drives the one or more sink devices through the one or more frame buffers.

25 Claims, 6 Drawing Sheets

METHOD AND APPARATUS FOR MANAGING RESOURCES FOR DISPLAYS

BACKGROUND

1. Field

The disclosed embodiments generally relate to displays for computer systems. More specifically, the disclosed embodiments relate to techniques and associated software structures that facilitate managing how video streams are directed to displays in computer systems.

2. Related Art

As the price of computer displays continues to decrease, it is becoming increasingly common for computer users to connect multiple displays to a single computer system. As a consequence, display topologies are becoming increasingly more complex, and the associated task of managing resources for the multiple displays has become correspondingly more complicated. For example, it is presently possible to drive multiple displays through a single shared link, which creates challenges in allocating the limited bandwidth on the shared link between the isochronous data streams that drive the individual displays.

The task of managing displays is further complicated by that fact that the display cards and associated software drivers are often produced by different vendors who implement different policies for managing display resources. Hence, the system behavior and associated user experience can vary significantly when a display card and associated driver are changed.

Hence, what is needed is a method and an apparatus that facilitates managing displays without the above-described problems.

SUMMARY

The disclosed embodiments provide a software infrastructure which facilitates managing multiple displays in a computer system. This infrastructure provides support for discovering and managing the multiple displays which can be connected in different topologies, such as daisy-chained interconnections or other interconnection structures. The infrastructure also facilitates providing a consistent user experience across different display cards and associated software drivers.

More specifically, the disclosed embodiments provide a system for managing multiple sink devices, such as displays or audio output devices, in a computer system. During operation, the system performs a discovery operation to identify one or more sink devices which are coupled to the computer system, wherein the discovery operation determines an interconnection topology between the computer system and the one or more sink devices, and wherein multiple sink devices can be coupled to the computer system through the same connector. Next, the system associates the one or more sink devices with one or more frame buffers which are used to assemble content streams for the one or more sink devices. Finally, the system drives the one or more sink devices with content from the one or more frame buffers.

In some embodiments, associating the one or more sink devices with the one or more frame buffers involves making a policy decision possibly (but not necessarily) based on one or more of the following: how many sink devices are coupled to the computer system; available bandwidth on one or more communication links which couple the one or more sink devices to the computer system; available hardware resources to support the one or more sink devices; and online/offline status of the one or more sink devices.

In some embodiments, the one or more sink devices can include one or more of: a video sink device which displays a video stream; an audio sink device which outputs an audio stream; and an audio-video sink device which displays a video stream and outputs an associated audio stream.

In some embodiments, upon detecting a change in the interconnection topology between the computer system and the one or more sink devices, the system dynamically updates the association between the frame buffers and the one or more sink devices.

In some embodiments, the change in the interconnection topology can include a hot plug of an additional sink device into the computer system, or a hot unplug of a sink device from the computer system.

In some embodiments, the interconnection topology between the computer system and the one or more sink devices can include a daisy-chained topology. The interconnection topology can also include branches, loops and/or parallel paths.

In some embodiments, associating the one or more sink devices with the one or more frame buffers involves: using a frame buffer controller module to generate frame buffer nubs for available frame buffers; and using a bandwidth controller module to associate sink devices with frame buffer nubs based on a policy decision.

In some embodiments, performing the discovery operation involves using a connector module to identify sink devices that are coupled to a given connector.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein.

The data structures and code described in this detailed description are typically stored on a non-transitory computer-readable storage medium, which may be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Computer System

Figure 1A:
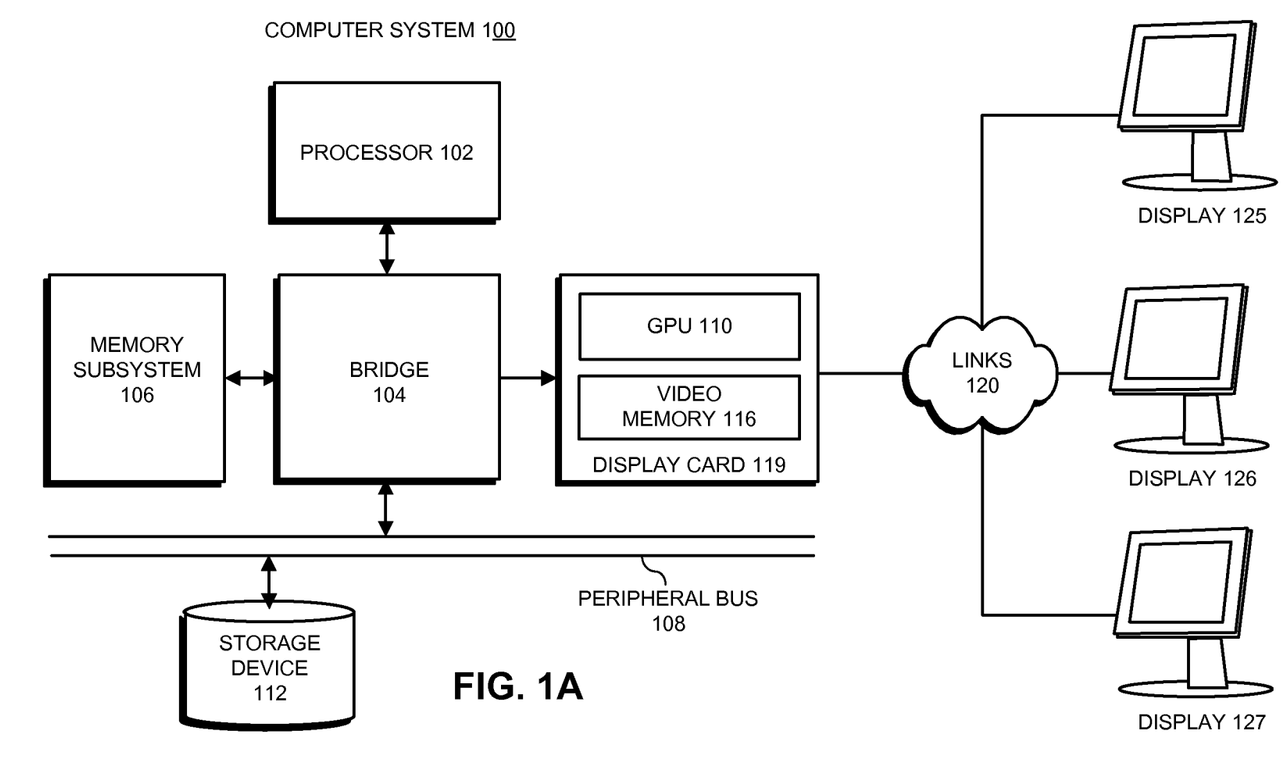
FIG. 1A illustrates a computer system in accordance with the disclosed embodiments.

FIG. 1A illustrates a computer system 100 in accordance with the disclosed embodiments. Computer system 100 may include a personal computer system, a laptop computer, a portable electronic device, a workstation, a server or any other electronic device that can drive one or more displays. Computer system 100 includes a processor 102 that is coupled through a bridge chip 104 to a memory subsystem 106, which contains semiconductor memory. Processor 102 also communicates with a storage device 112 containing non-volatile storage, through a peripheral bus 108 which is coupled to bridge chip 104. Note that storage device 112 can be a disk drive containing non-volatile magnetic storage.

Processor 102 also communicates with a number of displays 125-127 through display card 119. More specifically, processor 102 is coupled to display card 119 through bridge chip 104. Display card 119 includes a graphics processing unit (GPU) 110 which performs various graphical processing operations that produce video frames in one or more frame buffers which are located in video memory 116. These video frames are used to produce video streams which feed through one or more links 120 to drive displays 125-127. Note that in some embodiments, GPU 110 is not located within display card 119, but is instead located within bridge chip 104, or possibly at other locations within computer system 100. Similarly, in some embodiments, video memory 116 is not located within display card 119, but is instead located in memory subsystem 106, or possibly at other locations within computer system 100.

Figure 1B:
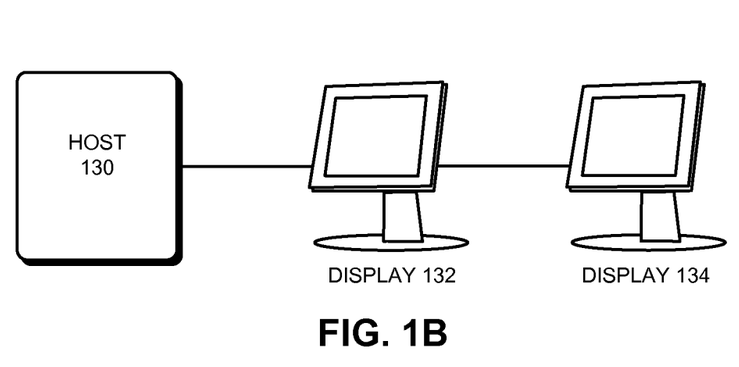
FIG. 1B illustrates how displays can be connected in a daisy-chained topology in accordance with the disclosed embodiments.

Links 120 can be configured in a number of different topologies, wherein the multiple displays 125-127 can possibly share a single link. For example, the displays can be connected in a daisy-chained topology as is illustrated in FIG. 1B, wherein a host 130 is directly connected to a display 132, which is daisy-chained to another display 134. Alternatively, referring to FIG. 1C, the displays can be connected to host 140 through a hub 141, which provides a number of branches that directly connect to displays 142 and 144. The links 120 which connect the displays can additionally include branches, loops and/or parallel paths (not shown in FIG. 1B).

Figure 1C:
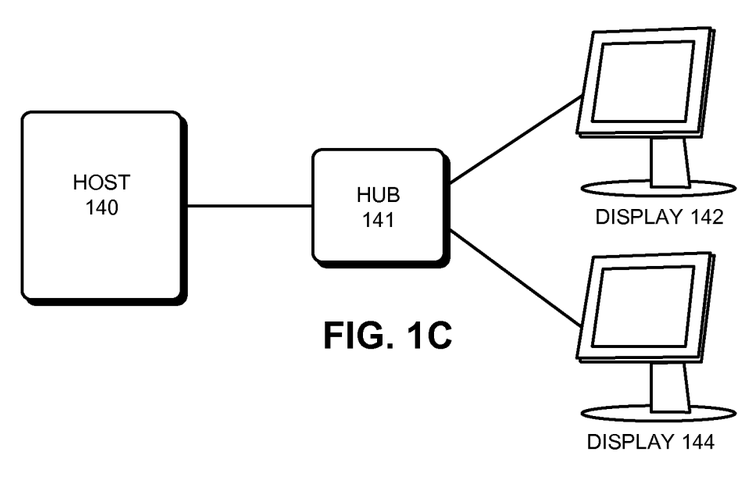
FIG. 1C illustrates how displays can be connected through a hub in accordance with the disclosed embodiments.

If a link is shared between multiple displays, it may be necessary to allocate the available bandwidth on the link between the isochronous data streams which drive each of the displays. In some cases, the link may not provide sufficient capacity to drive all of the displays at the same time, so the system will have to decide which displays can be lit. In other cases, the system may have to limit the amount of bandwidth that is allocated to a specific display stream, so that an associated display will have limited resolution.

Software Objects

Figure 2:
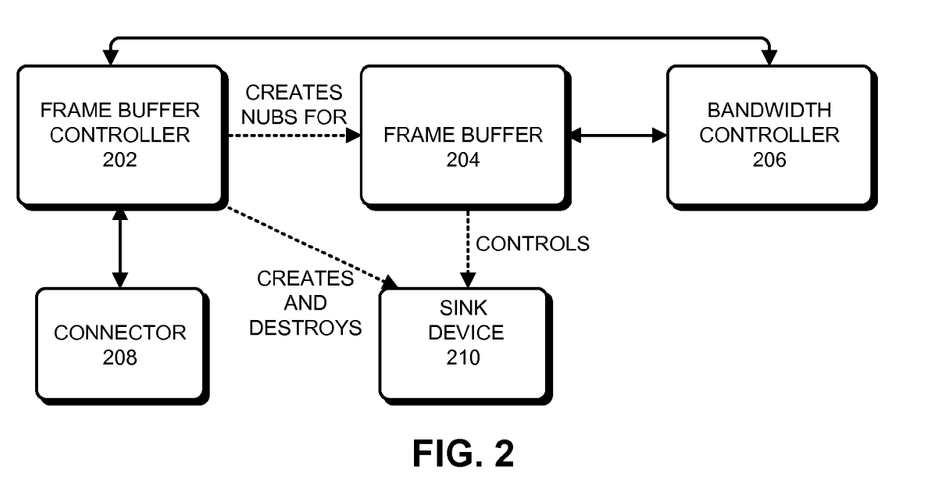
FIG. 2 illustrates relationships between various display-related software objects in accordance with the disclosed embodiments.

FIG. 2 illustrates relationships among various display-related software objects (which can more generally be referred to as "software modules" or "modules") in accordance with the disclosed embodiments. These software objects include a frame buffer controller (FBC) object 202, a frame buffer object 204, a bandwidth controller (BWC) object 206, a connector object 208 and a sink device object 210. (Note that the solid lines in FIG. 2 represent movement of data, which for example can be associated with link-training requests and allocated bandwidth.)

FBC object 202 manages one or more frame buffers for a specific GPU. During operation, FBC object 202 can create one or more frame buffer nubs which, for example, can be associated with frame buffer object 204. Connector object 208 represents a physical connector on a graphics card, wherein the physical connector carries display streams to one or more sink devices. Bandwidth controller (BWC) object 206 allocates bandwidth for various sink devices, which can possibly share a single communication link. Finally, sink device object 210 represents a sink device that supports audio output, video output or both. All of the above-mentioned objects are described in more detail below with reference to the device tree illustrated in FIG. 3.

Object Hierarchy

Figure 3:
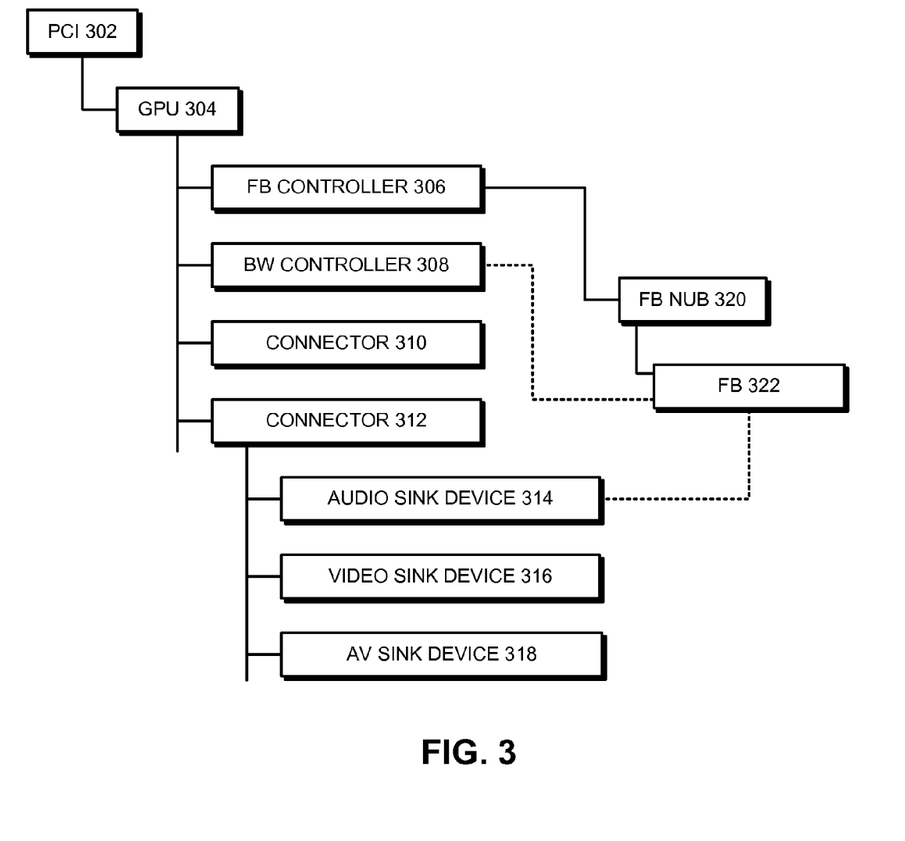
FIG. 3 illustrates a portion of an object hierarchy that represents relationships between display-related objects in accordance with the disclosed embodiments.

FIG. 3 illustrates a portion of an object hierarchy that represents relationships among various display-related objects in accordance with the disclosed embodiments. This object hierarchy provides a device tree as well as a collection of classes. Peripheral component interconnect (PCI) device 302 is located at the root of the device tree, and GPU object 304 is located directly underneath PCI device 302.

The lower-level nodes, which reside below PCI device 302 in the object hierarchy, represent software concepts within the operating system. For example, the lower-level nodes can represent control classes that provide interfaces which can be used to control how video and/or audio streams are directed to sink devices. Moreover, the interconnections among the lower-level nodes can represent a logical hierarchy among the objects associated with the control classes. Note that the object hierarchy illustrated in FIG. 3 can be constructed at system boot time, and can subsequently be updated if the configuration of the system changes during normal system operation.

GPU object 304 is associated with a number of the controller objects and the physical connector objects. More specifically, GPU object 304 is associated with an FBC object 306, a BWC object 308 and connector objects 310 and 312. (Note that the system is not limited to the two illustrated connector objects. In general, there can exist more or fewer connector objects.) Also note that connector objects 310 and 312 represent physical connectors and multiple sink devices can be coupled to a given connector object. For example, FIG. 3 illustrates how an audio sink device object 314, a video sink device object 316 and an audio-video (AV) sink device object 318 can all be coupled to the same connector object 312. Note that sink device objects 314, 316 and 318 are associated with individual frame buffer drivers which are typically produced by graphics card vendors. Connector object 312 can also perform a topology discovery operation to identify sink devices that are coupled to a given connector. Note that the devices which are coupled to a connector object do not necessarily represent the physical topology under the associated connector. In some cases, the devices only represent sink objects. In other cases, the devices also represent interconnecting structures which connect the sink objects.

FBC object 306 is responsible for creating connection points for the frame buffer drivers that are provided by vendors, and which represent sources of video data for the sink devices. For example, suppose 10 sink devices are associated with a single frame buffer controller, and the graphics card manufacturer indicates that the graphics card can support four sink devices. In this case, the system will provide four frame buffer nubs under the FBC object 306. Note that frame buffers, such as frame buffer 322, connect themselves to associated nubs, such as frame buffer nub 320. Also note that only one FBC instance is created per GPU, and the associated FBC class is not subclassable.

Moreover, an FBC instance can register for interrupts and hot plug/unplug events. If such an event occurs, the FBC object informs the associated BWC object. Also, during a hot plug operation, the FBC object may create frame buffer nubs and sink device objects. Conversely, during an unplug operation, the FBC object may destroy these objects and nubs.

The system uses BWC object 308 to determine how much bandwidth can be allocated to each frame buffer and how many frame buffers (and associated displays) the system can drive at the same time. Note that only one BWC object instance is created per GPU. Also note that the BWC object implements policies for managing bandwidth and performing link training and stream allocation for devices. More specifically, BWC object 308 can make policy decisions based on: how many sink devices the system has; how many nubs and associated frame buffer drivers are available; and how much bandwidth is available on the connectors. Based on these policies, the system can dynamically associate sink devices with frame buffer drivers.

During a hot plug operation when a new display is attached to a physical connector, an entry for the associated sink device object is added as a child of the associated physical connector object in the object hierarchy. This registry entry is attached to both the physical connector object and the associated frame buffer. Next, a BWC object allocates bandwidth for the sink device. If bandwidth is available and the new display is lit, then the same sink device object is also attached to its corresponding frame buffer object in the object hierarchy. Note that, if bandwidth is dissociated from a sink device by the BWC object, the associated sink device object's object hierarchy entry is detached from the frame buffer object, but remains attached to the connector object, so long as the associated display remains connected to the corresponding physical connector.

Process for Associating Sink Devices with Frame Buffers

Figure 4:
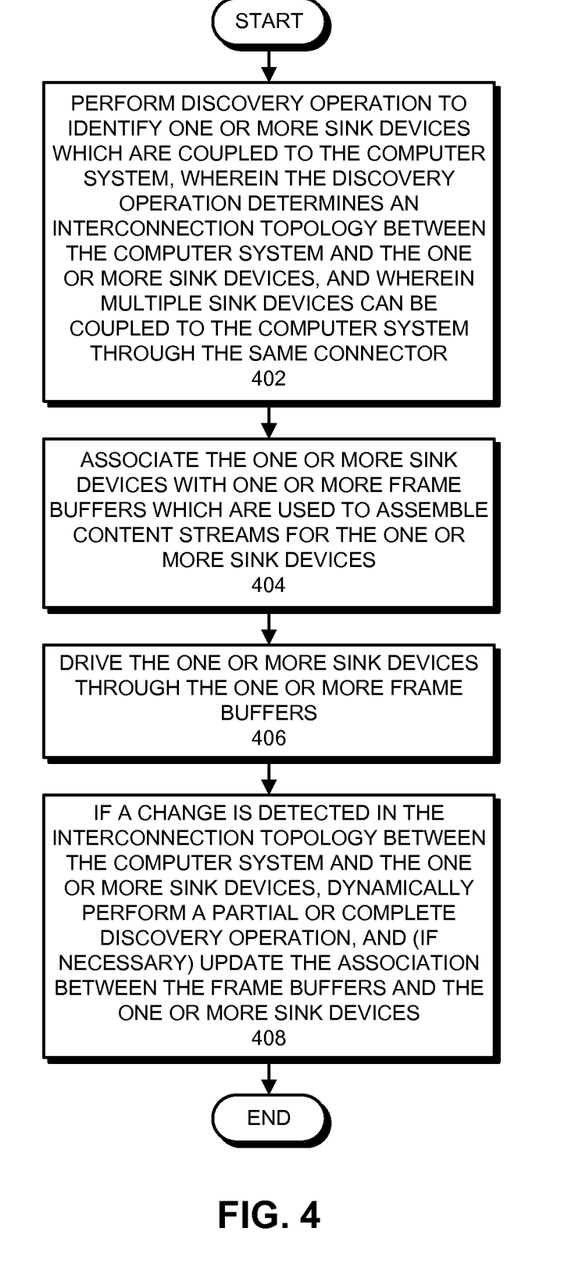
FIG. 4 presents a flow chart illustrating how sink devices are associated with frame buffers in accordance with the disclosed embodiments.

FIG. 4 presents a flow chart illustrating in more detail how the sink devices are associated with frame buffers in accordance with the disclosed embodiments. First, the system performs a discovery operation to identify one or more sink devices which are coupled to the computer system, wherein the discovery operation determines an interconnection topology between the computer system and the one or more sink devices, and wherein multiple sink devices can be coupled to the computer system through the same connector (step 402). Next, the system associates the one or more sink devices with one or more frame buffers which are used to assemble content streams for the one or more sink devices (step 404). Finally, the system drives the one or more sink devices through the one or more frame buffers (step 406).

During subsequent operation of the system, if a change is detected in the interconnection topology between the computer system and the one or more sink devices, the system dynamically performs a partial or complete discovery operation and, if necessary, updates the association between the frame buffers and the one or more sink devices (step 408).

Audio Signal Paths

Figure 5:
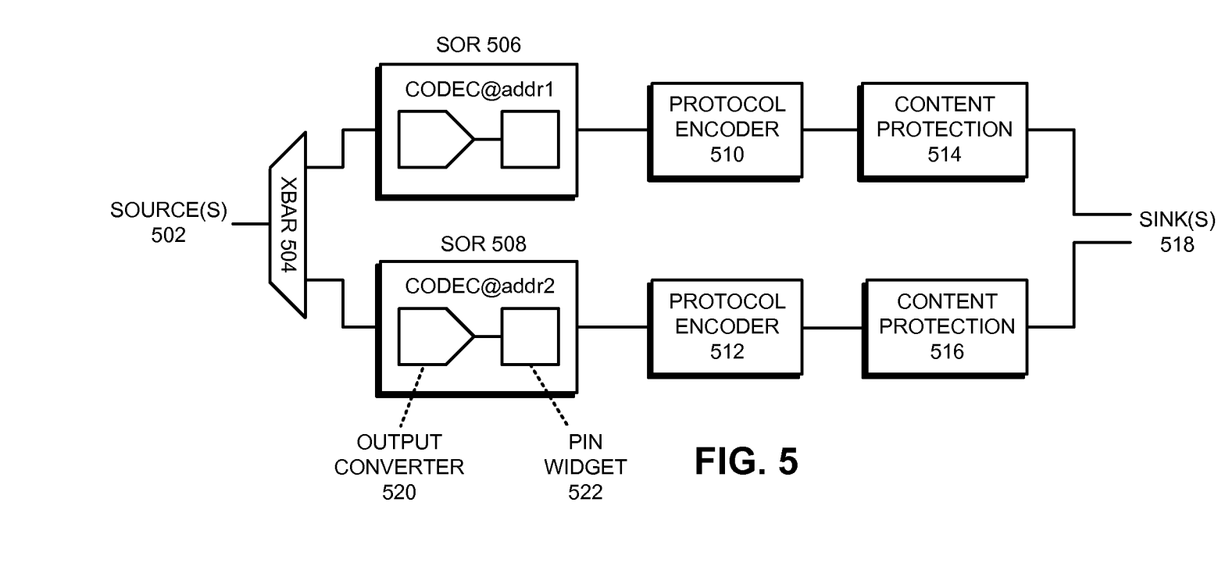
FIG. 5 illustrates an audio subsystem topology in accordance with the disclosed embodiments.

FIG. 5 shows the basic configuration for audio output signal paths from one or more audio sources 502 to one or more audio sink devices 518 in accordance with the disclosed embodiments. Audio streams for the audio sources 502 first pass through a switching network, such as a cross-bar switch (XBAR) 504, which routes a given audio stream either through an upper path including silicon output resource (SOR) 506, protocol encoder 510 and content protection module 514, or through a lower path including SOR 508, protocol encoder 512 and content protection module 516.

To support different protocols (such as DP or HDMI), several different codec devices can be provided to process an audio stream, wherein an individual codec device is identified by a unique address, such as CODEC@addr1 or CODEC@addr2. Note that a silicon output resource (SOR), such as SOR 508, represents a resource that includes a high-definition audio signal path, and is comprised of an output converter widget 520 and a pin complex widget 522. Moreover, although an SOR must have a unique signal path, an SOR is not required to have a unique codec device. Also, multiple SORs can share a single codec device but use unique signal paths, wherein an individual signal path is identified by a codec address in combination with a pin complex widget node ID. Note that when all pin complex widgets appear on the same codec, each pin complex widget node ID will be unique. Moreover, when each pin complex widget appears on a unique codec, the codec address will be unique, but the pin complex widget node ID may not be unique.

When bandwidth for the audio devices is under operating system control, the bandwidth can be managed by a bandwidth controller object, which is also used for visual content streams. Note that bandwidth for both audio and video is allocated from the same bandwidth pool.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for managing multiple sink devices in a computer system, comprising:
   performing a discovery operation to identify one or more sink devices which are coupled to the computer system; wherein the discovery operation determines an interconnection topology between the computer system and the one or more sink devices, and wherein multiple sink devices are configured to be coupled to the computer system via the same connector or via different connectors;
   connecting the one or more sink devices with one or more frame buffers based at least in part on the determined interconnection topology, wherein the one or more frame buffers are configured to store content streams for the one or more sink devices based on the determined interconnection topology; and driving the one or more sink devices through the one or more frame buffers.

2. The method of claim 1, wherein connecting the one or more sink devices with the one or more frame buffers involves making a policy decision based on:
   how many sink devices are coupled to the computer system;
   available bandwidth on one or more communication links which couple the one or more sink devices to the computer system;
   available hardware resources to support the one or more sink devices;
   online/offline status of the one or more sink devices;
   or a combination thereof.

3. The method of claim 1. wherein the one or more sink devices comprises one or more of:
   a video sink device which displays a video stream;
   an audio sink device which outputs an audio stream; and
   an audio-video sink device which displays a video stream and outputs an associated audio stream.

4. The method of claim 1, wherein upon detecting a change in the interconnection topology between the computer system and the one or more sink devices, the method further comprises dynamically updating the connection between the frame buffers and the one or more sink devices.

5. The method of claim 4, wherein detecting the change in the interconnection topology comprises:
   detecting a hot plug of an additional sink device into the computer system;
   detecting a hot unplug of a sink device from the computer system;
   or a combination thereof.

6. The method of claim 1, wherein the interconnection topology between the computer system and the one or more sink devices comprises a daisy-chained topology, a branch topology, a loop topology a parallel path topology, or any combination thereof.

7. The method of claim 1, wherein connecting the one or more sink devices with the one or more frame buffers involves:
   using a frame buffer controller module to generate frame buffer nubs for available frame buffers; and
   using a bandwidth controller module to associate sink devices with frame buffer nubs based on a policy decision.

8. The method of claim 1, wherein performing the discovery operation involves using a connector module to identify sink devices that are coupled to a given connector.

9. The method of claim 1, wherein the computer system includes:
   a processor;
   a memory;
   a display;
   one or more graphics processing mechanisms;
   a video memory, wherein the one or more frame buffers reside within the video memory; and
   a connector, which couple the computer system to the display.

10. A non-transitory computer-readable storage medium storing instructions that when executed by a computer cause the computer to perform a method for managing multiple sink devices in a computer system, the method comprising:
    performing a discovery operation to identify one or more sink devices which are coupled to the computer system;
    wherein the discovery operation determines an interconnection topology between the computer system and the one or more sink devices, and wherein multiple sink devices are configured to be coupled to the computer system via the same connector or via different connectors;
    connecting the one or more sink devices with one or more frame buffers based at least in part on the determined interconnection topology, wherein the one or more frame buffers are configured to store content streams for the one or more sink devices based on the determined interconnection topology; and
    driving the one or more sink devices through the one or more frame buffers.

11. The computer-readable storage medium of claim 10, wherein connecting the one or more sink devices with the one or more frame buffers involves making a policy decision based on:
    how many sink devices are coupled to the computer system;
    available bandwidth on one or more communication links which couple the one or more sink devices to the computer system;
    available hardware resources to support the one or more sink devices;
    online/offline status of the one or more sink devices;
    or a combination thereof.

12. The computer-readable storage medium of claim 10, wherein the one or more sink devices comprises one or more of:
    a video sink device which displays a video stream;
    an audio sink device which outputs an audio stream; and
    an audio-video sink device which displays a video stream and outputs an associated audio stream.

13. The computer-readable storage medium of claim 10, wherein upon detecting a change in the interconnection topology between the computer system and the one or more sink devices, the method further comprises dynamically updating the connection between the frame buffers and the one or more sink devices.

14. The computer-readable storage medium of claim 13, wherein detecting the change in the interconnection topology comprises:
    detecting a hot plug of an additional sink device into the computer system;
    detecting a hot unplug of a sink device from the computer system;
    or a combination thereof.

15. The computer-readable storage medium of claim 10, wherein the interconnection topology between the computer system and the one or more sink devices comprises a daisy-chained topology, a branch topology, a loop topology a parallel path topology, or any combination thereof.

16. The computer-readable storage medium of claim 10, wherein connecting the one or more sink devices with the one or more frame buffers involves:
    using a frame buffer controller module to generate frame buffer nubs for available frame buffers; and
    using a bandwidth controller module to associate sink devices with frame buffer nubs based on a policy decision.

17. The computer-readable storage medium of claim 10, wherein performing the discovery operation involves using a connector module to identify sink devices that are coupled to a given connector.

18. The computer-readable storage medium of claim 10, wherein the computer system includes:

a processor;
a memory;
a display;
one or more graphics processing mechanisms;
a video memory, wherein the one or more frame buffers reside within the video memory; and
a connector, which couple the computer system to the display.

19. A computer system that supports multiple sink devices, comprising:
a processor;
a memory;
one or more displays;
a graphics processing mechanism; and
a video memory, wherein one or more frame buffers reside within the video memory;
wherein the computer system is configured to perform a discovery operation to identify display devices which are coupled to the computer system, wherein the discovery operation determines an interconnection topology between the computer system and the one or more displays, and wherein multiple displays are configured to be coupled to the computer system via the same connector or via different connectors;
wherein the computer system is configured to connect the one or more sink devices with one or more frame buffers based at least in part on the determined interconnection topology, wherein the one or more frame buffers are configured to store content streams for the one or more sink devices based on the determined interconnection topology; and
wherein the computer system is configured to drive the one or more displays through the one or more frame buffers.

20. The computer system of claim 19, wherein while connecting the one or more sink devices with the one or more frame buffers involves making a policy decision based on:
how many sink devices are coupled to the computer system;
available bandwidth on one or more communication links which couple the one or more sink devices to the computer system;
available hardware resources to support the one or more sink devices;
online/offline status of the one or more sink devices;
or a combination thereof.

21. The computer system of claim 19, wherein upon detecting a change in the interconnection topology between the computer system and the one or more sink devices, the method further comprises dynamically updating the connection between the frame buffers and the one or more sink devices.

22. The computer system of claim 21, wherein detecting the change in the interconnection topology comprises:
detecting a hot plug of an additional sink device into the computer system;
detecting a hot unplug of a sink device from the computer system;
or a combination thereof.

23. The computer system of claim 19, wherein the interconnection topology between the computer system and the one or more sink devices comprises a daisy-chained topology, a branch topology, a loop topology a parallel path topology, or any combination thereof.

24. The computer system of claim 19, wherein while connecting the one or more displays with the one or more frame buffers, the computer system is configured to:
use a frame buffer controller module to generate frame buffer nubs for available frame buffers; and
use a bandwidth controller module to associate displays with frame buffer nubs based on a policy decision.

25. The computer system of claim 19, wherein while performing the discovery operation, the computer system is configured to use a connector module to identify displays that are coupled to a given connector.

* * * * *

UNITED STATES PATENT AND TRADEMARK OFFICE
CERTIFICATE OF CORRECTION

PATENT NO. : 8,656,060 B2  Page 1 of 1
APPLICATION NO. : 12/717731
DATED : February 18, 2014
INVENTOR(S) : George Kyriazis et al.

It is certified that error appears in the above-identified patent and that said Letters Patent is hereby corrected as shown below:

On the title page, item (75) Inventors, replace second inventor's surname "Macicsowicz" with correct spelling --Maciesowicz--.

Signed and Sealed this
Twenty-sixth Day of August, 2014

Michelle K. Lee
*Deputy Director of the United States Patent and Trademark Office*